Figure 1:
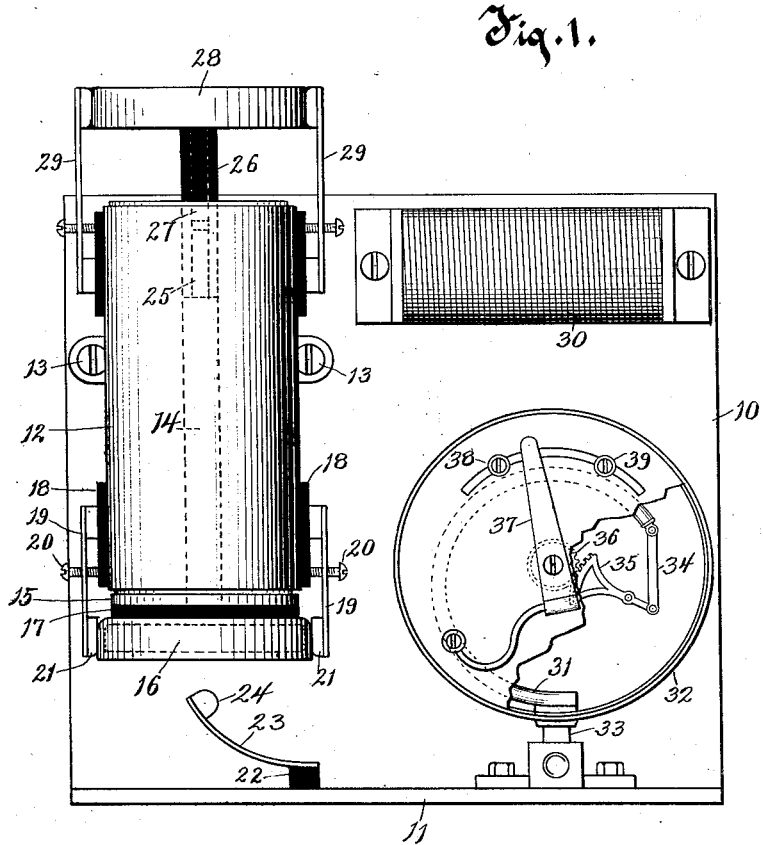

No. 821,672. PATENTED MAY 29, 1906.
W. J. RICHARDS.
AUTOMATIC CONTROLLER FOR MOTOR COMPRESSORS.
APPLICATION FILED MAR. 9, 1904.

2 SHEETS—SHEET 1.

No. 821,672. PATENTED MAY 29, 1906.
W. J. RICHARDS.
AUTOMATIC CONTROLLER FOR MOTOR COMPRESSORS.
APPLICATION FILED MAR. 9, 1904.

2 SHEETS—SHEET 2.

Witnesses:
C. N. Keeney.
R. S. Caldwell.

Inventor.
Walter J. Richards
By Benedict & Morsell
Attorneys.

UNITED STATES PATENT OFFICE.

WALTER J. RICHARDS, OF MILWAUKEE, WISCONSIN.

AUTOMATIC CONTROLLER FOR MOTOR-COMPRESSORS.

No. 821,672. Specification of Letters Patent. Patented May 29, 1906.

Application filed March 9, 1904. Serial No. 197,317.

*To all whom it may concern:*

Be it known that I, WALTER J. RICHARDS, residing in Milwaukee, in the county of Milwaukee and State of Wisconsin, have invented new and useful Improvements in Automatic Controllers for Motor-Compressors, of which the following is a description, reference being had to the accompanying drawings, which are a part of this specification.

This invention relates to certain new and useful improvements in automatic controllers for motor-compressors, and has for its object to provide certain novel means for maintaining a given range of fluid-pressure in fluid-pressure systems by automatically starting and stopping the motor-compressor at predetermined minimum and maximum pressures in the fluid-pressure system.

A further object of this invention, broadly stated, is to provide a constantly-opposed shunt-magnet operating a main switch for a motor-compressor, such shunt-magnet being directly operated by a primary switch.

A further object is in such a device as above mentioned to provide means for inserting an external high resistance in series with the shunt-magnet when the main switch is closed.

A further object of this invention is to accomplish the objects above set forth by means substantially as the following: a solenoid-operated main switch controlling the circuit of a motor-driven compressor for a fluid-pressure system, which system contains a fluid-pressure two-point primary switch to control the movements of the main switch; a means provided for short-circuiting the contact-points of the primary switch when said switch closes to operate the motor, said main switch in its operation being adapted to connect a motor with the line-wire direct and place an external high resistance in series with a solenoid of the main switch, which solenoid received the full flow of current at the time of completing the circuit at one point of such primary switch to operate the motor, as above mentioned. These connections being made independent of the primary switch, the parts are therefore maintained in this relation after the contact at the primary switch is broken and until a contact is made with the second point of the primary switch, due to the maximum pressure in the fluid-pressure system arrived at by the operation of the motor. The second contact of the primary switch has the effect of deënergizing the solenoid, retaining the switch in its closed position, to thereby permit the return of the switch parts to their initial positions, and so break the connection between the motor and the line-wire, bridge over the external high resistance, and remove the short circuit of the first-mentioned primary-switch contacts.

One of the main troubles with the present type of controllers operated by shunt-magnets is the uncertainty of their action, due to the varying voltage to which they are subjected. Another trouble is that where shunt-magnets alone are used they must be wound with a large amount of expensive fine wire to give them the necessary resistance if the circuits are such that the current is on any coil a considerable length of time. If the circuits are such that the current is but momentarily applied for operating the magnets, then rebounding of the operated switches occurs. Also because of the likelihood of parts getting out of order the current will sooner or later be placed on the magnets for a length of time, resulting in their burning out.

The above objections to present forms of controllers are sought to be overcome with the present invention by means of novel details of construction, arrangement, and operation of parts to be more fully set forth herein.

With the above and other objects in view the invention consists in the devices and parts and their equivalents, as hereinafter referred to.

Figure 2:
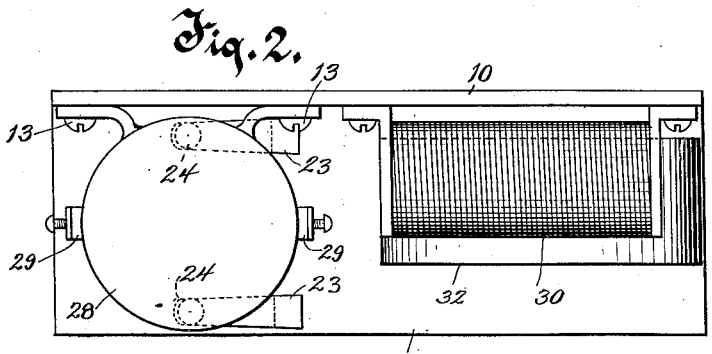
Figure 3:
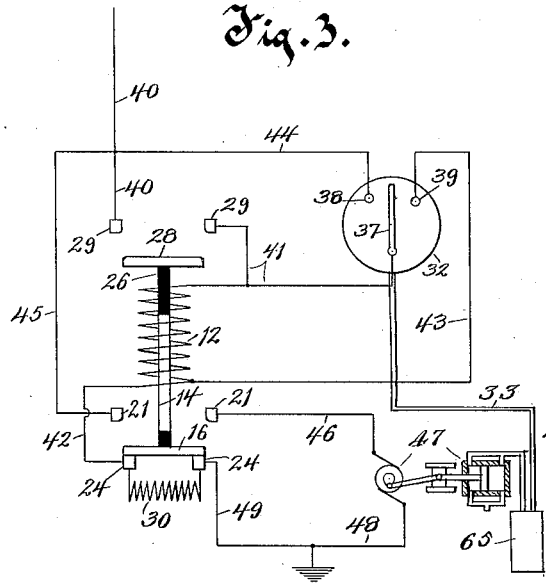
Figure 4:
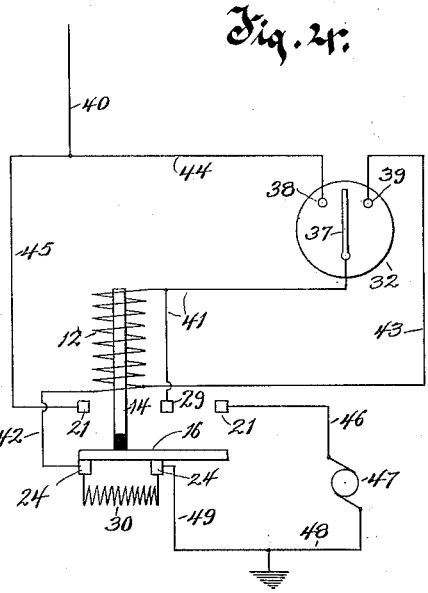
Figure 5:
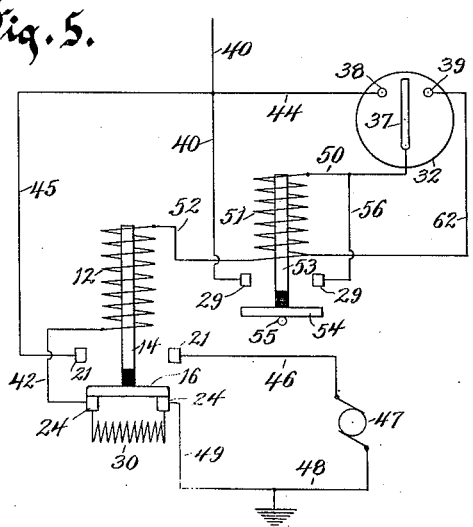
Figure 6:
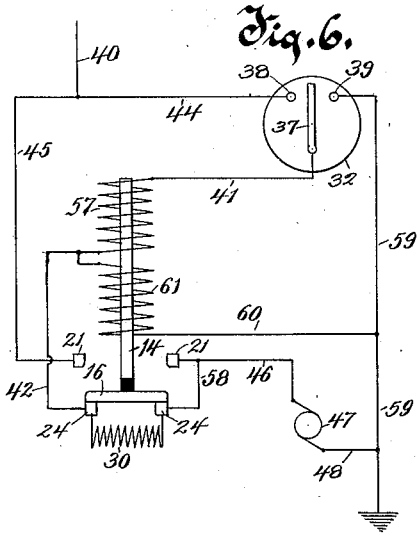

Referring to the accompanying drawings, in which like characters of reference indicate the same or equivalent parts in the several views, Figure 1 is a front elevation of a type of controller embodying this invention. Fig. 2 is a plan view thereof. Fig. 3 is a diagram of the circuits of the system for such type of controller, and Figs. 4, 5, and 6 are similar views of the systems for modified forms of controllers.

In the drawings, 10 represents a base of any suitable material, preferably provided with a lower flange 11, extending in a plane at right angles to the main portion of the base.

A solenoid 12 is secured to the main portion of the base in any suitable manner, as by screws 13, and the movable core 14 thereof carries at its lower end a rigidly-connected disk 15, of iron or other magnetic material. A copper cylindrical contact-disk 16 is rigidly connected to the disk 15 and is insulated therefrom by an intervening disk 17, of any suitable insulating material, the cylindrical disk 16, being slightly larger in diameter than the disks 15 and 17 and having its lower edge turned inwardly to form a flat bearing-surface for a purpose to be later described. At each side of the solenoid 12 and insulated therefrom by an insulating-block 18 is a downwardly-extending spring-brush 19, which has threaded therethrough an adjusting-screw 20, abutting with the insulating-block 18, upon which the spring-brush is mounted and adapted to determine the position of the contact-shoe 21, carried at the end of said spring-brush, so that the shoe may be adjusted to engage with slight pressure against the periphery of the cylindrical disk 16 when the core 14 is raised to its uppermost position, as shown in Fig. 1 of the drawings.

Insulating-blocks 22 are secured to the flange 11, and upon them are mounted a pair of bent strap-springs 23, curving upwardly and carrying at their ends contact-buttons 24 to be engaged by the inturned edge or bearing surface of the cylindrical disk 16 when said disk is dropped by the deënergizing of the solenoid 12. The cylindrical disk 16 and the parts to which it is attached are cushioned in falling by the springs 23, said springs being straightened out by the weight of these parts and exerting an upward tendency thereon to aid the solenoid in lifting them when said solenoid is again energized.

At its upper end the solenoid-core 14 is reduced to form a shouldered stem 25, upon which is fitted an insulating thimble or sleeve 26, which also engages with the non-magnetic stem 27 of a copper contact-disk 28, which is electrically insulated from the core 14 by the thimble or sleeve 26, and when the core 14 is in its uppermost position, as shown in Fig. 1, the contact-disk 28 engages with upwardly-extending spring-brushes 29 at the upper end of the solenoid 12, similar in all respects to brushes 19.

A spool of high resistance 30 is mounted on the base and has its terminals connected with spring-contacts 23 by means not shown in Figs. 1 and 2, but to be later referred to with respect to Fig. 3. Mounted on the base 10 also is a fluid-pressure-controlled two-point primary switch, in which 31 is a curved spring-tube like or similar to those employed in pressure-gages. It is attached at one end to a nipple inside of a case 32 and communicates at that end with a pipe 33, which connects it with an associated compressor 47 or with a reservoir 65, supplied with compressed air by said compressor. The free end of said tube is connected by a link 34 with a segment-gear 35, which meshes with a pinion 36 on the pivot-pin of an arm 37 like or similar to the hand of a pressure-gage, which extends between and is adapted to contact with the minimum and maximum pressure contact-pieces 38 and 39, respectively. The contact-pieces 38 and 39 are adjustably secured in a curved slot in the face or cover of the case 32 to admit of varying the maximum and minimum limits of the pressure to be maintained.

The wiring for the form of controller, as above described, is shown in the diagram of Fig. 3, in which the several operative parts are shown by conventional forms. In this diagram 40 is a line-wire, in this instance of a grounded circuit, which connects with one of the contact-brushes 29, the other of said brushes 29 connecting with the arm 37 of the primary switch by a wire 41, which also connects with one terminal of the solenoid 12. The other terminal of the solenoid 12 connects with one of the contacts 24 by means of a wire 42 and with the maximum contact-piece 39 by means of a wire 43. The line-wire 40 is connected to the minimum contact-piece 38 by means of a wire 44 and to one of the contacts 21 by means of the wire 45, while the other of said contacts 21 connects, by means of a wire 46, to a motor-compressor 47, said motor being connected to ground by a wire 48. The external high resistance 30 is connected between the two contacts 24, as before mentioned, and the contact 34, which is not connected by the wire 42 to the solenoid, is connected by wire 49 to the ground.

From the foregoing it will be seen that normally when the core 14 of the solenoid 12 is in its lowermost position, as shown, no current passes through any part so long as the hand 37 remains between the two contact-pieces 38 and 39 and the disk 16 therefor rests upon the contacts 24 with the weight of the moving parts upon the springs 23, as before mentioned. When the pressure in the fluid-pressure system becomes sufficiently reduced to bring the contact-arm 37 into engagement with the contact-piece 38, a circuit is established from the line-wire 40, through the wire 44, to the contact-piece 38 and the contact-arm 37, contacting therewith, and by way of wire 41, through the solenoid 12 and wire 42, across the bridge formed by a disk 16 between the contacts 24 without passing through the resistance 30, and by way of wire 49 to the ground. Thus the solenoid has become energized with the full flow of the current and quickly raises its core 14 to cause the disk 16 to bridge across the contacts 21 and the disk 28 to bridge across the contacts 29. This operation accomplishes the following results: The motor 47 is connected direct to the line-wire 40 by means of the wire 45, bridged into connection with wire 46 by means of the disk 16 engaging contacts 21, the current passing through the motor 47 and the wire 48 to the ground, and therefore starting the operation of the fluid-compressor. The connection between the contact-arm 37 and the contact-piece 38 is short-circuited by reason of the connection established by the disk 28 in engagement with the contacts 29, and the solenoid 12 is given a shunt-circuit in series with the high resistance 30, inasmuch as the current passing from the line-wire 40 and across the disk 28 to the wire 41 passes through the solenoid 12 and by way of the wire 42 through the resistance 30, which is then not bridged by the disk 16, and by way of wire 49 to the ground. By the latter circuit the core 14 is held in its upper position to maintain the connections described even after the contact-arm 37 leaves the contact-piece 38, so that the fluid-compressor continues its operation until the maximum pressure in the fluid-pressure system is reached, when the parts are restored to their initial positions, as now to be described.

The pressure in the fluid-pressure system on reaching the maximum causes the contact-arm 37 to engage with the contact-piece 39, and as the contact-arm 37 is in connection with one end of the solenoid 12 by means of wire 41 and the contact-piece 39 is in connection with the other end of the solenoid 12 by means of wire 43 the solenoid is by such engagement short-circuited, so that it becomes deënergized and permits the core 14 to drop to its initial position and remove the disks 28 and 16 from the contacts 29 and 21, respectively, and incidentally bridges over the resistance 30 by the disk 16 resting on the contacts 24. The breaking of the connections between the contacts 29 and 21 shuts off the current altogether, and the motor 47 ceases to operate and remains inactive until the pressure of the fluid-pressure system has become reduced to such an extent that the contact-arm 37 is again brought into engagement with the contact-piece 38, when the operation above described is repeated, so that at all times the pressure in the fluid-pressure system is maintained between the two points at which contact is made by contact-arm 37 with the contact-pieces 38 and 39, respectively, and as these contact-pieces are adjustable to and from each other these limits may be varied to suit requirements.

It is obvious that instead of providing contacts 29 to be connected by the disk 28 for the purpose of connecting the wire 41 with the line-wire 40 at the time the core 14 is raised by the solenoid 12 the same effect may be accomplished by locating the contact 29, which is in connection with the wire 41, at the lower end of the solenoid similarly to contacts 21, so as to be engaged by the disk 16, and this modification is represented in the drawings by the diagram shown in Fig. 4. With this construction the operation is practically the same as with that described for the construction shown in diagram in Fig. 3, but may be briefly described as follows: Normally while the motor-compressor 47 is inactive the core 14 of the solenoid 12 is in its lower position, in which the disk 16 bridges over the resistance 30 and no current is passing; but when the contact-arm 37 of the primary switch engages with the contact-piece 38, due to the pressure in the fluid-pressure system becoming reduced to the minimum pressure, current passes from the line-wire 40, through wire 44 to the contact-piece 38 and through the contact-arm 37, engaging therewith, and the wire 41 to the solenoid 12, and by wire 42 across the disk 16 to the ground by way of wire 49. The solenoid 12 being energized by the current passing therethrough raises its core 14 and lifts the disk 16 from the contact-points 24, so as to throw the resistance 30 in series with the solenoid 12, and carries said disk 16 into contact with the contacts 21 and 29. (In the drawings the disk 16 is extended on one side for the convenience of the diagram illustration; but in practice it does not differ from the disk 16 of the construction previously described.) These connections accomplished by the operation of the solenoid serve to short-circuit the connection made between the contact-arm 37 and the contact-piece 38 by the bridging over of the contact 29 and the contact 21 in connection with the line-wire by the disk 16, so that the flow of current established by the engagement in the primary switch will continue even after the contact-arm 37 leaves the contact-piece 38. Furthermore, the disk 16, connecting the two contacts 21, causes current to pass from the line-wire 40 direct through the motor 47 and to the ground by means of wires 45, 46, and 48, and the solenoid 12 is given a shunt connection from the contact 29, which, as before stated, has then direct connection with the line-wire through disk 16 and wire 45 by means of wire 41, connecting said solenoid with the contact 29, and the wire 42, connecting the other end of said solenoid to a contact 24, and as the disk 16 is then out of engagement with the contacts 24 the current passes through the resistance 30 and wire 49 to the ground.

As before described, the current passing through the motor causes it to operate the fluid-compressor until the desired compression in the fluid-pressure system is reached, when the primary switch establishes a new connection by causing the contact-arm 37 to engage with the contact-piece 39, so as to short-circuit the solenoid 12, inasmuch as the wire 41 connects the contact-arm 37 to one end of the solenoid and the wire 43 connects the contact-piece 39 to the other end of the solenoid. By being short-circuited the solenoid becomes deënergized and allows the core 14 to drop, so as to remove the disk 16 from engagement with the contacts 21 and 29 and again rest upon the contacts 24 to bridge over the resistance 30; but the breaking of the connections between the disk 16 and the contact 21, which is in connection with the line-wire 40, breaks the circuit and the flow of current ceases entirely until the primary switch is again caused to make a connection between the contact-arm 37 and the contact-piece 38, due to the minimum pressure in the fluid-pressure system being reached. Thus, as before, the motor-compressor is automatically caused to operate to increase the pressure in the fluid-pressure system when said pressure reaches a predetermined minimum and continues to operate until a maximum pressure is attained, when the compressor is automatically stopped until the minimum pressure is again reached.

From the foregoing it will be seen that one of the main principles of this invention is the provision for short-circuiting the contacts which primarily establish the circuit when the minimum pressure is reached in the fluid-pressure system, and this is a desirable feature, inasmuch as the engagement made by the contact-arm 37 with the contact-point 38 could not well be relied upon to carry the current for any length of time for a number of reasons. In the first place the movements of the contact-arm 37 are trembling, and by reason of that fact the contact made thereby would naturally be intermittent, and so unsatisfactory for the purpose. Again, it would be highly impractical to attempt to rely upon the slight engagement of these parts to carry any valuable quantity of current for even a short time; and, finally and most important, as it is desired to continue the operation of the motor-compressor until the maximum pressure is reached it is obvious that if such contact only were relied upon the result would be that the motor-compressor would cease to operate as soon as the pressure had been raised sufficient to move the contact-arm 37 away from the contact-point 38. A further object in providing for short-circuiting the contacts of the primary switch is to prevent an arc being drawn therebetween when the contact-arm is moved away from the contact-piece. It is obvious that such short-circuiting of the primary switch may be accomplished in other ways, and in Fig. 5 I have shown in diagram a modified form of the invention in which this is done. In this form of the invention the contact-arm 37 of the primary switch instead of being connected directly with the solenoid 12, as in the forms of invention previously described, is connected, by means of a wire 50, to one end of a supplemental solenoid 51, and the other end of said solenoid 51 connects, by means of a wire 52, to the main solenoid 12, the latter solenoid having its other end connected, by means of wire 42, to a contact 24, and the resistance 30, disk 16, and wire 49 in this construction having the same relations as in the other forms of the invention. The contacts 21 and the wires 45 and 46, with the motor 47 and wire 48, also have their relative positions and functions as in the other forms of invention. However, the core 53 of the supplemental solenoid 51 carries at its end an insulated disk 54, similar to the disk 16, which in its lower position engages with a suitable stop 55, and which disk 54 when the core 53 is raised by the solenoid 51 to its upper position bridges across a pair of contacts 29, similar to the contacts 29 of the forms of invention previously described—that is, one of the contacts 29 is in connection with the line-wire 40 and the other is connected with the wire leading to the contact-arm 37, in this instance by means of a wire 56, connected with wire 50. A wire 57 connects the contact-piece 39 of the primary switch with the other end of the supplemental solenoid 51 to that with which wire 50 connects.

In the operation of this form of controller the parts in their normal positions, as shown in the drawings, pass no current; but as soon as the primary switch makes connection between the contact-arm 37 and the contact-piece 38 by reason of the minimum pressure in the fluid-pressure system current passes from the line-wire 40 through said contacts of the primary switch and by way of wire 50, solenoid 51, wire 52, solenoid 12, wire 42 to a contact 24, across the disk 16 to the other contact 24, and thence by way of wire 49 to the ground. Both of the solenoids 51 and 12 are therefore energized and raise their cores and connecting-disks into engagement with the contacts 29 and 21, respectively. The bridging across of the contacts 29 by means of the disk 54 has the effect of short-circuiting the contacts of the primary switch, as before, leaving the winding of the solenoid 51 in series with the solenoid 12, the current entering by way of the wire 40, crossing the contacts 29 through the disk 54, then through the wires 56 and 50 and the solenoid 51 and by way of wire 52 to the solenoid 12, and from there to the ground by way of the resistance 30 and wires 42 and 49, as with the other forms of the device. The operation of the solenoid 12 serves to connect the motor 47 direct with the line-wire by means of the same agents employed in the other constructions. In this form of the invention, while the protective resistance 30 is provided, as before, it is obvious that inasmuch as the solenoid 51 is in series with the solenoid 12 such protective resistance may be dispensed with, though its presence is preferred.

When the maximum pressure is reached in the fluid-pressure system, by reason of the continued operation of the motor-compressor, due to the connections thus established, the second connection is made at the primary switch by the contact-arm 37 engaging the contact-piece 39, so that the solenoid 51 is short-circuited. This causes the core of such solenoid to drop, breaking the connection between the contacts 29, and so depriving the solenoid 12 of its current, which permits the core 14 to also drop and open the connection between the contacts 21, and thus stop the operation of the motor-compressor 47 until the parts are again brought into operation by the fall of pressure in the fluid-pressure system in the same manner as before described.

In the forms of invention shown in diagram in Figs. 3 and 4 the main-switch solenoid 12 is deënergized by being short-circuited by the primary switch, and in that form illustrated by diagram in Fig. 5 the solenoid of the main switch is deënergized by the breaking of its circuit by the operation of the supplemental switch; but it is obvious that a still further means may be employed for deënergizing the solenoid of the main switch—namely, by neutralizing the effect of the solenoid by a contrary force. This latter means is employed in the form of controller shown in diagram in Fig. 6, in which the motor 47 has one terminal connected with the ground by wire 48 and the other terminal connected by a wire 46 to one of the contacts 21, as in the other constructions, the other contact 21 being connected by the wire 45 to the line-wire 40, also as before. Similarly the minimum contact-piece 38 of the primary switch connects with the line-wire 40 by a wire 44, and the contact-arm 37 of said primary switch connects by a wire 41 with a coil 57, forming one part of the solenoid of the main switch. The wire 42 connects the other end of said coil with one of the pair of contacts 24, which have the protective resistance 30 between them normally bridged over by the disk 16 on the core 14, as in the other constructions; but in this case the other contact 24, instead of connecting to the ground direct, as with the other forms, connects by means of a wire 58 to the wire 46, leading to the motor 47. The contact-piece 39 of the primary switch is connected by a wire 59 to the ground and also with a wire 60, which connects to another coil 61 of the solenoid of the main switch, which coil joins with the coil 57 and is wound to give the same number of ampere-turns as the coil 57. It is also to be noted that the coils 57 and 61 form solenoids of themselves and combine to form a single solenoid when the current passes from one coil through the other by reason of their windings being in the same direction, the entire being, in effect, a single solenoid with its winding tapped at its middle portion to divide the solenoid into two component parts. The operation of the two coils 57 and 61 upon the core 14 is the same by reason of the fact that they are solenoids operating upon a single magnetic circuit of which the core 14 forms a part. With this construction of controller the contact at the primary switch between the contact-arm 37 and the contact-piece 38 when the pressure in the fluid-pressure system reaches the minimum establishes a circuit from the line-wire 40 and the wire 44 through said contacts and the wire 41 to the coil 57 and by way of wire 42 and disk 16 without passing through the resistance 30, through wires 58 and 46 and the motor 47 to the ground by wire 48. It will be noted that a division of the current will take place at the point where the coil 61 joins with the coil 57, and a small portion of the current will pass through the said coil 61 and by way of wires 60 and 59 to the ground; but as the motor 47 is the only resistance in the other branch of this circuit and said motor being at rest does not oppose the flow thereof by a counter electromotive force the portion of the current passing through the coil 61 is small; but inasmuch as it acts in the same direction as the coil 57 it adds to the pulling effect of said coil 57. The coil 57 by reason of the passage of current therethrough raises the core 14 and the disk 16 to remove the bridge from the resistance 30 and connect the motor 47 direct with the line-wire 40 by said disk engaging the contacts 21, so that the current for the motor passes from the line-wire 40 through the wire 45 and across the contacts 21 through the disk 16 and through wire 26 to said motor and by wire 48 to the ground. Meanwhile the contact-points of the primary switch and the coil 57, which are in series with each other, are short-circuited by the closing of the main switch, since one contact 21 is in connection with the contact-point 38 by means of the wires 45 and 44 and the terminal of coil 57 is in connection with the other of said contacts 21 by means of the wires 42 and 58 with the interposed resistance 30. In order that the core 14 shall not be dropped, a new circuit is established by the coil 61 being connected in shunt in the following manner: The current passing through wire 46 is tapped by wire 58 and carried through the resistance 30 and wire 42 to the upper end of the coil 61, through which it passes in the same direction as before and passes to the ground by way of wires 60 and 59. Thus a portion of the solenoid of the main switch is connected in shunt with the protective resistance 30 in series therewith, and the motor 47 is connected direct across the line, while the original contacts at the primary switch are short-circuited.

As in the other forms of the invention, the current continues to pass through the motor-compressor 47 until the maximum pressure in the fluid-pressure system is reached and the contact-arm 37 is brought into engagement with the contact-piece 39. This connection at the primary switch causes the current to divide at the point where the two coils of the solenoid connect with each other and to the wire 42, and an equal portion of the same passes through the two coils 57 and 61; but the portion passing through the coil 57 travels in an opposite direction to that in which it originally traveled and through the wire 41 and the contacts of the primary switch to the ground by way of wire 59. Thus the solenoid-coils 57 and 61 being of equal strength and the current passing through them in opposite directions their effects are opposed, so that each neutralizes the other to enable the core 14 to drop to its initial position and break the connection between the contacts 21, thereby opening the circuit entirely until the first connection of the primary switch is again made, due to a minimum pressure in the fluid-pressure system, when the operation above described is repeated.

From the foregoing it will be seen that in the several modified forms of the controller set forth herein as embodying the principles of my invention each accomplishes the results desired in a simple and efficient manner without the employment of apparatus liable to destruction or derangement in the use to which it is put, and altogether the parts constitute a simple and compact mechanism.

In all cases the initial flow of current through the solenoid is made without the protective resistance 30 being in circuit in order that the solenoid may have its greatest power in lifting the core 14, with its attached parts, but that subsequently during the time that the solenoid is only required to retain the core 14 and the disk in their raised position the external resistance 30 is included in series with the solenoid to reduce the flow of current therethrough and protect the same against burning out, which might otherwise occur. By this means the device is adapted to consume less current for maintaining the main switch closed than is necessary to close the main switch. Furthermore, in all of the forms of controllers shown the contact-points of the primary switch are short-circuited as soon as the main switch is closed and the motor-compressor is connected direct with the line-wire.

In the present invention the opposing solenoids for operating the main switch found in many controllers in general use are replaced by a single solenoid having a constant opposing force, such as gravity or a spring means, and therefore the operation of the device is more simple because of the fact that the mechanism is self-contained, needs no alinement. Another desirable feature lies in the fact that the moving switch is not constrained in its right-line movement, thereby avoiding a large amount of friction, which would otherwise have to be overcome by the main solenoid and would require a larger and more expensive solenoid.

As in certain supply-mains the voltage varies greatly and this controller works practically independent of the varying voltage, it is evident that such feature is one of much importance. The opening of the circuit is always accomplished by a force of the same strength, and the closing of the circuit is accomplished by a solenoid which is in series with an automatic resistance, the solenoid being so wound as to be strong enough to close the main switch when the minimum voltage is applied and the external resistance being sufficient to reduce the current in the main solenoid to that point where the solenoid cannot burn out when the maximum voltage is on the mains.

Another advantage in this controller is that after the operation of the switch in either direction the operating means continues, so that no rebounding of the switch can occur. The rebounding of the main switch occurs in those types of controllers where the operating means is but momentarily applied, resulting in a momentary reëngagement of the switch, thereby causing arcing and danger to the apparatus.

Another advantage over other controllers is the unlikelihood of the solenoids burning out. This is because of the insertion of the automatic resistance after the function of the switch has been performed. This also results in the economical working of the solenoid, inasmuch as the current required to hold the core of the solenoid in engagement is much less than the current required to operate the core of the solenoid from a distance. Another advantage lies in the fact that the controllers as shown in the accompanying drawings are cheaper of construction, dispensing with one of the usual opposing solenoids, which is wound with an expensive wire incased with an iron surrounding with considerable workmanship upon it. It thus appears that one expensive solenoid wound with costly wire and upon which considerable workmanship is required is replaced by means of an inexpensive wire resistance wound on a form which requires but very little workmanship and which permits of excellent ventilation for cooling the coil.

Another advantage is to be found in the operation of the springs on which the core rests when the switches are out of engagement. The action of the springs is to store the energy of the falling core, this energy to be returned to the core to assist the solenoid in the operation of engaging the main switches. It is thus seen that the strength of solenoid required is very much smaller than that required in solenoids where the core is pulled from a distance without the aid of a restoring-spring. When disengaging the main contacts, it will be noted that the action of the spring does not extend so far as to exert a pressure on the plunger until after the main contacts are out of engagement, it being desired to use the full weight of the core to disengage the main contacts. It is thus seen that when the core of the magnet is in the position to have the least pull exerted upon it by the solenoid the spring is in the position to give the greatest assistance, and vice versa, and therefore the combined force exerted by both the spring and the solenoid is nearly uniform over the entire range of movement of the core.

It is to be understood that inasmuch as other means for withdrawing the core from the solenoid may be employed than that of gravity, as in the constructions herein shown, it is not the intention to limit the claims to this particular means, but that such substitutes are to be considered equivalents therefor, and in this connection the term "lifting" is intended to imply the act of moving the core and its attached parts against such means.

What I claim as my invention is—

1. In a fluid-pressure system, a controller for a motor-compressor comprising a solenoid in shunt with the motor, a gravity-retracted core for said solenoid, a main switch for the motor connected with the core, a primary switch for controlling the operation of the solenoid in series therewith and actuated by the pressure of the fluid-pressure system, and means operated by the core of the solenoid for short-circuiting the solenoid-energizing contact of the primary switch.

2. In a fluid-pressure system, a controller for the motor-compressor thereof comprising a magnet, a main switch for the motor actuated thereby, and adapted to oppose the influence of the magnet, a primary switch for controlling the operation of said magnet in series therewith and actuated by the pressure of the fluid-pressure system, and a circuit controlled by the primary switch for short-circuiting the magnet.

3. In a fluid-pressure system, a controller for the motor-compressor thereof, comprising a primary switch actuated by the pressure of the fluid-pressure system, a magnet controlled by the primary switch in series therewith and in shunt with the motor-compressor, a main switch for the motor-compressor operated by the magnet, means for automatically short-circuiting the connection made by the primary switch to energize the magnet, and means for automatically inserting a resistance in series with the magnet while the said magnet is energized and for removing said resistance from the magnet-circuit when the magnet is deënergized.

4. In a device of the character described, a solenoid, a movable core operated thereby, a contact carried by the core, a pair of contacts adapted to be connected by the core-contact when the solenoid is deënergized, a resistance between the pair of contacts adapted to be placed in series with the solenoid when the core-contact is removed from the pair of contacts, a second pair of contacts adapted to be engaged by the core-contact to complete a motor-circuit, a primary switch adapted to make a connection to send current to the solenoid when in one position and to make a connection to short-circuit the solenoid when in another position, and means controlled by the movements of the core for short-circuiting the first-mentioned connection made by the primary switch.

5. In a device of the character described, a solenoid, a movable core operated thereby, a contact carried by the core, a pair of contacts to be connected by the core-contact when the solenoid is deënergized, a resistance between the pair of contacts to be placed in series connection with the solenoid when the core-contact is removed from the pair of contacts, a second pair of contacts adapted to be engaged by the core-contact to complete a motor-circuit, a primary switch adapted to make a connection to send current to the solenoid when in one position and to make a connection to short-circuit the solenoid when in another position and a second contact carried by the core coöperating with another pair of contacts to short-circuit the first-mentioned connection made by the primary switch when the core is operated.

6. In a device of the character described, a solenoid, a movable core operated thereby, a contact carried by the core, a pair of contacts capable of being connected by the core-contact when the solenoid is deënergized, a resistance between the pair of contacts and placed in series with the solenoid when the core-contact is removed from the pair of contacts, a second pair of contacts adapted to be engaged by the core-contact to complete a motor-circuit, a primary switch adapted to make a connection to send current to the solenoid when in one position and to make a connection to short-circuit the solenoid when in another position, and another contact engaging the core-contact to short-circuit the first-mentioned connection made by the primary switch when the movement of the core is effected.

7. In a fluid-pressure system, a controller for the motor-compressor thereof, comprising a magnet in shunt with the motor, a main switch for the motor actuated thereby, and adapted to oppose the influence of the magnet, a primary switch for controlling the operation of the magnet in series therewith and actuated by the pressure of the fluid-pressure system, and means for short-circuiting the magnet-energizing contact of the primary switch when the magnet is energized.

8. In a fluid-pressure system, a controller for the motor-compressor thereof comprising a magnet in shunt with the motor, a main switch for the motor actuated thereby, and adapted to oppose the influence of the magnet, a primary switch actuated by the pressure of the fluid-pressure system adapted to make an electrical connection to energize the magnet, and means for short-circuiting the said connection of the primary switch when the magnet is energized, said primary switch being also adapted to make another connection, for deënergizing the magnet.

9. In a fluid-pressure system, a controller for the motor-compressor thereof comprising a magnet in shunt with the motor, a main switch for the motor actuated thereby, and adapted to oppose the influence of the magnet, a primary switch for directly controlling the operation of said magnet in series therewith and actuated by the pressure of the fluid-pressure system, and a circuit controlled by the primary switch for short-circuiting the magnet.

10. In a fluid-pressure system, a controller for the motor-compressor thereof, comprising a primary switch actuated by the pressure of the fluid-pressure system, a magnet in series with and controlled by the primary switch, a main switch for the motor-compressor operated by the magnet, means for automatically short-circuiting the connection made by the primary switch to energize the magnet, means for automatically inserting resistance in series with the magnet while said magnet is energized and for removing said resistance from the magnet-circuit when the magnet is deënergized, and means for opposing the withdrawal of the main switch from the magnet adapted to assist the magnet in operating the main switch.

11. In a fluid-pressure system, a controller for the motor-compressor thereof, comprising a magnet in shunt with the motor-compressor, a main switch for the motor-compressor operated by the magnet, a primary switch actuated by the pressure of the fluid-pressure system and adapted to control the operation of the magnet, said magnet adapted to be deënergized by having its winding short-circuited, and a resistance in series with the magnet to prevent the short circuit of the magnet constituting a short circuit of the motor-compressor.

12. In a fluid-pressure system, a controller for the motor-compressor thereof, comprising a primary switch actuated by the pressure of the fluid-pressure system, a magnet adapted to be energized and deënergized by said primary switch, a main switch for the motor-compressor operated by the magnet, said magnet being in shunt with the motor-compressor and adapted to be deënergized by having its winding short-circuited, and means operated by the magnet for inserting a resistance in series with the magnet whereby the short-circuiting of the magnet is prevented from short-circuiting the motor-compressor.

13. In a fluid-pressure system, a controller for the motor-compressor thereof, comprising a primary switch actuated by the pressure of the fluid-pressure system, a magnet adapted to be energized and deënergized by the primary switch, a main switch for the motor-compressor operated by the magnet, said magnet being in shunt with the motor-compressor and adapted to be deënergized by having its winding short-circuited, and a resistance in series with the magnet short-circuited by the main switch when the magnet is not energized and included in the circuit with the magnet when the magnet is energized whereby the short-circuiting of the magnet for deënergizing it does not short-circuit the motor-compressor.

14. In a fluid-pressure system, a controller for the motor-compressor thereof, comprising a primary switch actuated by the pressure of the fluid-pressure system, a magnet in shunt with the motor-compressor and in series with the primary switch and adapted to be energized by one contact made by the primary switch, a main switch for the motor-compressor operated by the magnet, said magnet being adapted to be deënergized by having its winding short-circuited by another contact made by the primary switch, and a resistance in series with the magnet whereby the short-circuiting of the magnet does not short-circuit the motor-compressor.

15. In a fluid-pressure system, a controller for the motor-compressor thereof, comprising a primary switch actuated by the pressure of the fluid-pressure system, a magnet in shunt with the motor-compressor and in series with the primary switch and adapted to be energized by one contact made by the primary switch, a main switch for the motor-compressor operated by the magnet, said magnet being adapted to be deënergized by having its winding short-circuited by another contact made by the primary switch, and means operated by the magnet for inserting a resistance in series with the magnet when the magnet is energized whereby the short-circuiting of the magnet by the primary switch does not short-circuit the motor-compressor.

16. In a fluid-pressure system, a controller for the motor-compressor thereof, comprising a primary switch actuated by the pressure of the fluid-pressure system, a magnet in shunt with the motor-compressor and in series with the primary switch and adapted to be energized by a contact made by the primary switch, a main switch for the motor-compressor operated by the magnet, means operated by the magnet for short-circuiting the magnet-energizing contact of the primary switch when the magnet is energized, said magnet adapted to be deënergized by having its winding short-circuited by another contact made by the primary switch, and means operated by the magnet for inserting a resistance in series with the magnet when the magnet is energized whereby the short-circuiting of the magnet by the primary switch does not short-circuit the motor-compressor.

In testimony whereof I affix my signature in presence of two witnesses.

WALTER J. RICHARDS.

Witnesses:
R. S. C. CALDWELL,
ANNA F. SCHMIDTBAUER.